United States Patent [19]

Nakamura et al.

[11] Patent Number: 4,827,331
[45] Date of Patent: May 2, 1989

[54] COLOR TV CAMERA WITH CIRCUIT FOR ADJUSTING THE WHITE BALANCE OF RED, GREEN, AND BLUE SIGNALS GENERATED FROM A NARROW-BAND LUMINANCE SIGNAL AND LINE-SEQUENTIAL COLOR-DIFFERENCE SIGNALS

[75] Inventors: Satoshi Nakamura; Toshiharu Kondo, both of Kanagawa, Japan

[73] Assignee: Sony Corporation, Tokyo, Japan

[21] Appl. No.: 101,133

[22] Filed: Sep. 25, 1987

[30] Foreign Application Priority Data

Sep. 25, 1986 [JP] Japan .................. 61-226911

[51] Int. Cl.⁴ .......................... H04N 9/73; H04N 9/07
[52] U.S. Cl. .......................... 358/29; 358/41; 358/44
[58] Field of Search ............ 358/29 C, 39, 41, 43, 358/44

[56] References Cited

U.S. PATENT DOCUMENTS 4,415,923 11/1943 Noda ............................ 358/41
4,670,777 6/1987 Ishikawa et al. ................ 358/44

FOREIGN PATENT DOCUMENTS 57-50186 3/1982 Japan ................ 358/29 C

OTHER PUBLICATIONS

Nabeyama, Hiroaki, et al., "All Solid State Color Camera with Single-Chip MOS Imager", *IEEE Transactions on Consumer Electronics*, vol. CE-27, Feb., 1981, pp. 40–46.

Primary Examiner—James J. Groody
Assistant Examiner—Randall S. Svihla
Attorney, Agent, or Firm—Hill, Van Santen, Steadman & Simpson

[57] ABSTRACT

A solid-state image sensor with a color separation, filter generates a luminance signal component and line-sequential color-difference signal components. Low-pass filters produce wide-band and narrow-band luminance signals from the luminance signal component. A synchronous detection circuit, a delay circuit, and a switching circuit produce simultaneous color-difference signals from the line-sequential color-difference signal components. A level control circuit adjusts the white balance of red, green, and blue signals produced from the narrow-band luminance signal and the simultaneous color-difference signals. A narrow-band luminance signal and simultaneous color-difference signals produced from the white-balanced red, green, and blue signals together with the wide-band luminance signal are encoded into a color video signal.

4 Claims, 3 Drawing Sheets

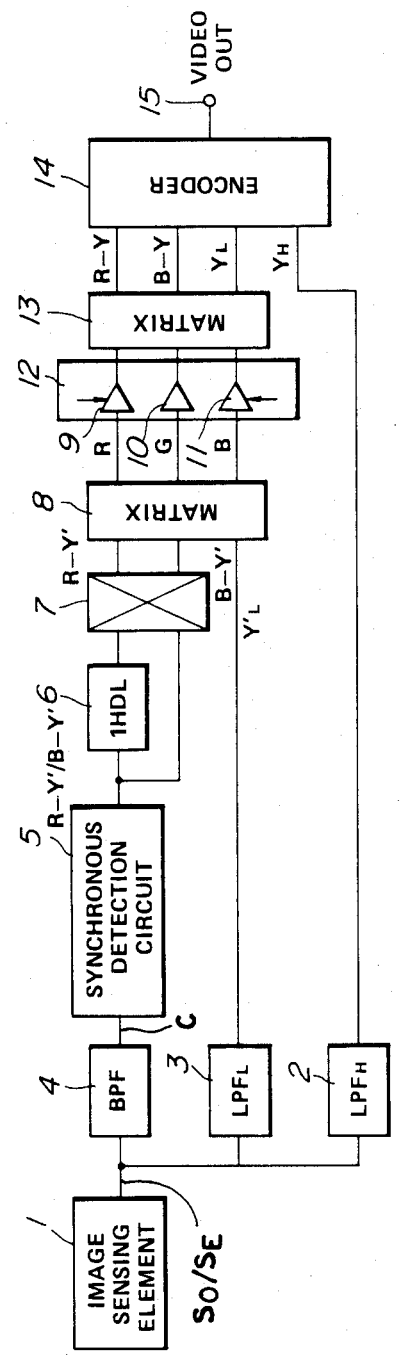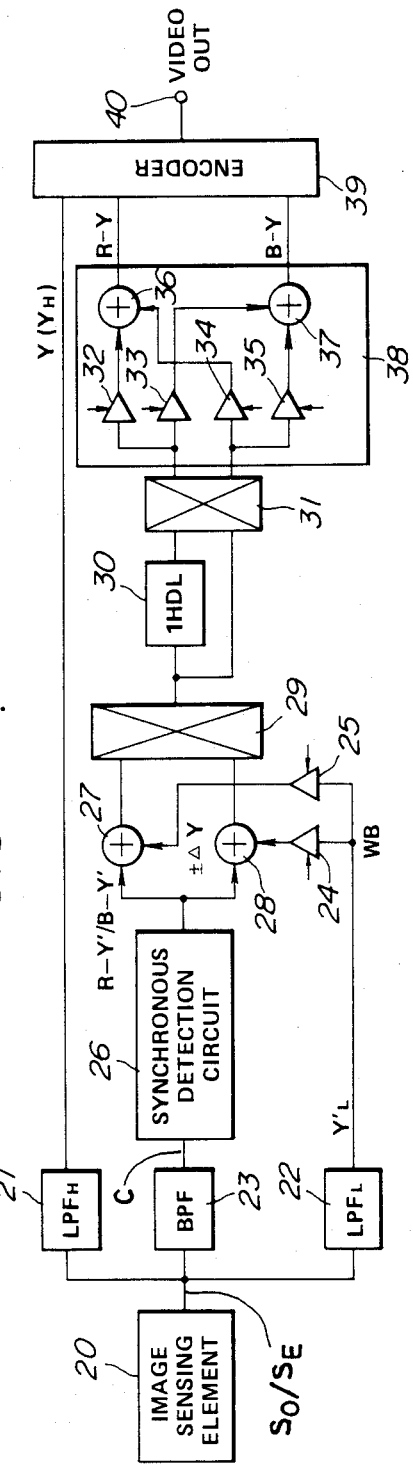

FIG.2

| | | | | | | |
|---|---|---|---|---|---|---|
| L (N) | Mg | G | Mg | G | Mg | G |
| L (N+1) | Cy | Ye | Cy | Ye | Cy | Ye |
| L (N+2) | Mg | G | Mg | G | Mg | G |
| L (N+3) | Ye | Cy | Ye | Cy | Ye | Cy |
| L (N+4) | Mg | G | Mg | G | Mg | G |
| L (N+5) | Cy | Ye | Cy | Ye | Cy | Ye |
| L (N+6) | Mg | G | Mg | G | Mg | G |

ODD FIELD
EVEN FIELD
ODD FIELD
EVEN FIELD
ODD FIELD

FIG.4 (PRIOR ART)
FIG.5 (PRIOR ART)
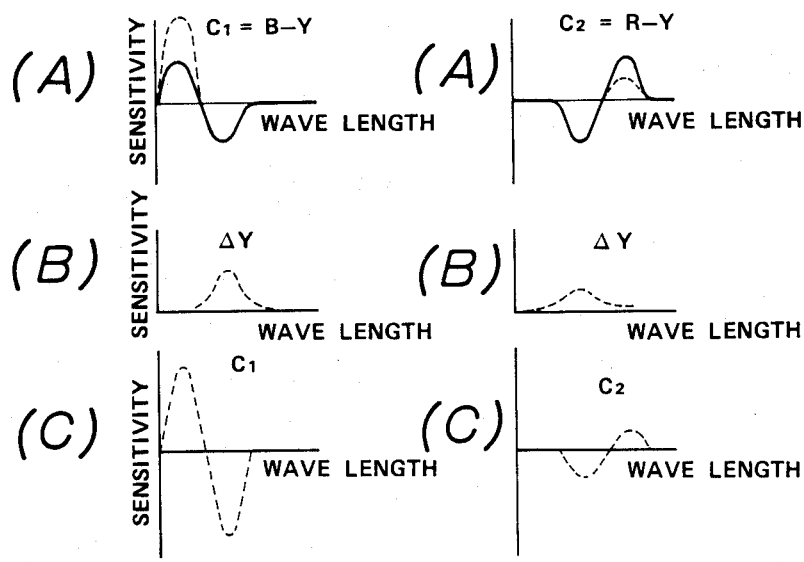
FIG.6 (PRIOR ART)
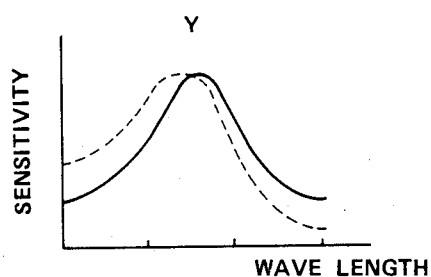

COLOR TV CAMERA WITH CIRCUIT FOR ADJUSTING THE WHITE BALANCE OF RED, GREEN, AND BLUE SIGNALS GENERATED FROM A NARROW-BAND LUMINANCE SIGNAL AND LINE-SEQUENTIAL COLOR-DIFFERENCE SIGNALS

BACKGROUND OF THE INVENTION

1. Field of the Invention

This invention relates to a solid state color television camera having a solid state image sensing device wherein an image signal processing is executed for generating a composite color video signal.

2. Description of the Prior Art

It has been customary in a color video camera to achieve a white balance control in order not to cause changes in a white part of an image due to the temperature of a light source. Also, in a single plate television camera, wherein the single solid state imager performs a color image sensing, a complementary color filter with a high light utilization efficiency is provided to an image sensing optical system as a color separating filter to perform a color iamge sensing by a field-accumulated image sensing device so as to improve an image sensing sensitivity or a dynamic resolution, etc.

In such type of a color television camera, an imaging operation is performed using an image sensing element with a complementary color filter for color coding provided on its image sensing plane in which color filters of magenta (Mg), green (G), cyan (Cy), yellow (Ye), for example, are arranged in a mosaic pattern as seen in FIG. 2. Thus there is obtained an image sensing output which is an additive synthesis of signal electric charges of $L_{(N)}$ line and $L_{(N+1)}$ line as an image sensing output of an odd field. Similarly, an image sensing output which is an additive synthesis of signal electric charges of $L_{(N+1)}$ line and $L_{(N+2)}$ line is obtained as an image sensing output of an even field. From the aforementioned image sensing element with the complementary color filter, an image output ($S_o$) wherein (Mg+Cy) output and (G+Ye) output are repeatedly produced and an image output ($S_E$) wherein (Mg+Ye) output and (G+Cy) output are repeatedly produced are line sequentially produced.

As shown in FIG. 3, in the conventional devices, a color video signal was formed by supplying the image sensing output obtained by the above-described image output element to an image sensing signal processing circuit.

In FIG. 3, the numeral 20 indicates the image sensing element with said complementary color filter, 21 indicates a first low-pass filter ($LPF_H$) that picks up a wide band luminance signal Y ($Y_H$) from the image sensing output ($S_O$)/($S_E$) obtained as a line sequential output by the image sensing element 20, 22 indicates a second low-pass filter ($LPF_L$) that picks up a narrow band luminance signal ($Y_L'$) from the image sensing output, and 23 indicates a band-pass filter (BPF) that picks up a chroma signal (C) from the image sensing output.

The first low-pass filter 21 forms a wide band luminance signal Y ($Y_H$) by excluding a space sampling carrier component produced by the complementary color filter from the image sensing output ($S_O$)/($S_E$). The wide band luminance signal Y ($Y_H$) is supplied to a color encoder 39.

Also, the second low pass filter 22, the cut-off frequency of which is lower than that of the first low-pass filter 21, forms a narrow band luminance signal ($Y_L'$) by excluding a space sampling carrier component. This narrow band luminance signal ($Y_L'$) is supplied to a signal adder 27, 28 as a white balance control signal ($\pm \Delta Y$) via a variable gain amplifier 24, 25.

Further, in the band-pass filter 23, the space sampling carrier component produced by the complementary color filter, i.e. a chroma signal, is picked up from the image sensing output ($S_O$)/($S_E$) to be supplied to a synchronous detection circuit 26.

The synchronous detection circuit 26 performs a synchronous detection of the chroma signal picked up from the image sensing output ($S_O$)/($S_E$) with a carrier signal corresponding to the space sampling carrier component so as to produce an output of a line sequential color difference signal (R−Y')/(B−Y'), hereinafter denoted by ($C_1$)/($C_2$).

Then, there is provided an additive synthesis of the white balance control signal ($\pm \Delta Y$) in the signal adder 27, 28 to the line sequential color difference signal ($C_1$)/($C_2$) that was outgoing from the synchronous detection circuit 26, which is supplied to the simultaneous circuit 31 direct from a signal selecting circuit 29 or via a one horizontal period (1H) delay circuit 30.

The line sequential color difference signal ($C_1$)/($C_2$) to which a white balance control has been already achieved is converted from the line sequential system to the simultaneous system due to the simultaneous circuit 31.

It is to be noted that when the color temperature of the object the image of which is picked up in the image sensing element 20 varies from the normally-set color temperature to the higher one, each color difference signal ($C_1$)/($C_2$) changes the state indicated by a line to the state indicated by a chain-dotted line, both of which are shown in FIGS. 4(A) and 5(A). Also, the luminance signal (Y) changes the state indicated by a line to the state indicated by a chain-dotted line in FIG. 6. Therefore, it is possible to execute a white balance control as shown in FIGS. 4(C) and 5(C), by generating a white balance control signal ($\pm \Delta Y$) indicated by the chain-dotted lines in FIGS. 4(B) and 5(B) from the narrow band luminance signal ($Y_L'$), and by performing an additive and subtractive synthesis of said white balance control signal ($\pm \Delta Y$) with each color difference signal ($C_1$)/($C_2$) such that the waveformed integral value shown in FIGS. 4(A) and 5(A) becomes zero.

However, even by this white balance control, each color difference signal ($C_1$)/($C_2$) changes its sensitivity due to the wave length, and results to have characteristics different from a spectral sensitivity (response) at the normally-set color temperature.

Hence, in regard to the respective color difference signals ($C_1$)/($C_2$) that were outgoing from the simultaneous circuit 31, it has been customary to perform a compensation beforehand to the changes of the color temperature in a color temperature control circuit 38, and then to generate a color video signal of a standard television system, such as an NTSC system, in a color encoder 39 to let it outgo from a signal output terminal 40. In this connection, the color temperature control circuit 38 is also called as a linear matrix circuit, where there is performed an additive synthesis of the respective color difference signals ($C_1$)/($C_2$) in each signal adder 36, 37 via variable gain amplifiers 32, 33, 34, 35 wherein the gain varies according to the color temperature so as to control the spectral sensitivity characteristics.

As earlier noted, with the known image sensing signal processing circuit wherein the white balance is controlled by providing an additive and subtractive synthesis of the white balance control signal ($\pm\Delta Y$) to each color difference signal ($C_1$)/($C_2$), it becomes impossible to maintain the color reproducibility because of the change in the spectral sensitivity characteristics caused by the change of the color temperature. So it is necessary to provide a color temperature control circuit having complicated circuit structure in order to control the changes of the spectral sensitivity characteristics.

OBJECTS AND SUMMARY OF THE INVENTION

In view of the foregoing, it is an object of the present invention to provide a solid state color television camera with a novel structure, according to which, a composite color video signal with superior color reproducibility and luminance reproducibility against the color temperature changes can be generated without using a color temperature control circuit.

More specifically, it is a feature of the present invention to provides a solid state color television camera having a solid state image sensing device with a color filter comprising a signal converting means, a signal separating means, a level control means, a matrix means and an encoding means.

In a solid state color television camera of the present invention, a three-primary-color signal is generated from an image sensing output of a color difference line sequential system color video camera and a white balance control is achieved thereon, thus it requires no color temperature compensation.

Other objects and advantages of the invention will be apparent in the following description, the appending claims and the accompanying drawings.

BRIEF DESCRIPTION OF THE DRAWINGS

FIG. 1 is a schematic block diagram of a circuit configuration of an embodiment of the invention of a solid state color television camera having a solid state image sensing device.

FIG. 2 illustrates a structure of a complementary color filter for color coding formed on the image sensing plane of a color image sensing device.

FIG. 3 is a block diagram illustrating a conventional circuit configuration of a solid state image sensing device.

FIGS. 4, 5, and 6 illustrate spectral characteristics of the respective signals in the conventional circuit configuration shown in FIG. 3.

DESCRIPTION OF A PREFERRED EMBODIMENT

The invention of a solid state color television camera will now be described by way of example with reference to the accompanying drawings.

In a schematic block diagram of FIG. 1, the numeral 1 indicates an image sensing element having a complementary color filter, 2 indicates a first low-pass filter (LPF$_H$) by which a wide band luminance signal ($Y_H$) is picked up from an image sensing output ($S_O$)/($S_E$) obtained as a line sequential output by the image sensing element 1, 3 indicates a second low-pass filter (LPF$_L$) by which a narrow band luminance signal ($Y_L'$) is picked up from the image sensing output, and 4 indicates a band-pass filter (BPF) by which a chroma signal (C) is picked up from the image sensing output.

In the present embodiment, a complementary color filter for color coding with the arrangement shown in FIG. 2 is provided on the image sensing plane of the image sensing element 1 so as to produce a line sequential output of an image sensing output ($S_O$)/($S_E$) of an object image.

The aforementioned first low-pass filter 2 generates a wide band luminance signal ($Y_H$) by excluding a space sampling carrier component produced by the complementary color filter from the image sensing output ($S_O$)/($S_E$). This wide band luminance signal ($Y_H$) is supplied to a color encoder 14.

The second low-pass filter 3 has a cut-off frequency lower than that of the first low-pass filter 2, and forms a narrow-band luminance signal ($Y_L'$) by excluding the space sampling carrier component. This narrow band luminance signal ($Y_L'$) is supplied to a first matrix circuit 8 for separating a three-primary-color signal.

Also, in the band-pass filter 4, the space sampling carrier component produced by the complementary color filter, i.e. a chroma signal, is picked up from the image sensing output ($S_O$)/($S_E$) and is supplied to a synchronous detection circuit 5.

In the synchronous detection circuit 5, the chroma signal (C) picked up from the image sensing output ($S_O$)/($S_E$) is synchronously detected by a carrier signal corresponding to the space sampling carrier. In such manner, there is generated a composite color difference signal ($C_1$) that is given by $$\begin{aligned} C_1 &= (Mg + Cy) - (G + Y_E) \\ &= 2B - G \\ &= B - Y \end{aligned}$$

to the image sensing output. Also, there is generated a composite color difference signal ($C_2$) that is given by $$\begin{aligned} C_2 &= (Mg + Ye) - (G + Cy) \\ &= 2R - G \\ &= R - Y \end{aligned}$$

to the image sensing output ($S_E$), thus, producing an output of a line sequential color difference signal ($C_1$)/($C_2$) or ($B-Y'$)/($R-Y'$), hereinafter denoted as ($R-Y'$)/($B-Y'$).

It should be noted that said ($Y'$) is a luminance signal obtainable by excluding the space sampling carrier component from the image sensing output ($S_O$)/($S_E$), and can be indicated as $$\begin{aligned} Y' &= (Mg + Ye) + (G + Cy) \\ &= 3G + 2R + 2B \end{aligned}$$

The line sequential color difference signal ($C_1$)/($C_2$) that was outgoing from the synchronous detection circuit 5 is supplied directly or via 1H delay circuit 6 to a simultaneous circuit 7, wherefrom conversion from the line sequential system to the simultaneous system is executed.

The simultaneous color difference signal ($C_1$), ($C_2$) thus obtained in the simultaneous circuit 7 is supplied to the first matrix circuit 8.

In the first matrix circuit 8, in regard to the low-pass luminance signal ($Y_L'$) and each color difference signal ($C_1$), ($C_2$), a matrix processing as $$\begin{pmatrix} R \\ G \\ B \end{pmatrix} = \begin{pmatrix} r1 & r2 & r3 \\ g1 & g2 & g3 \\ b1 & b2 & b3 \end{pmatrix} \begin{pmatrix} Y_L \\ R-Y \\ B-Y \end{pmatrix}$$

is executed to separate a three-primary-color signal (R).(G).(B). For the respective matrix constants, the spectral characteristics of each signal ($Y_L'$).(R−Y').(B−Y') is taken into consideration, for example, setting a value such that when in search of R signal, G and B elements are restricted.

The three-primary-color signal (R).(G).(B) separated by the first matrix circuit 8 is supplied to the second matrix circuit 13 via a level control circuit 12 for a white balance control constructed by the amplifier 10 and the variable gain amplifiers 9 and 11.

From the aforementioned second matrix circuit 13 there is formed a narrow band luminance signal ($Y_L$) and each color difference signal (R−Y).(B−Y) both of which are supplied to a color encoder 14 by executing a reverse matrix processing of the first matrix circuit 8 on the three-primary-color signal (R).(G).(B) supplied via the level control circuit 12 to which a white balance control being already executed.

Also, said color encoder 14 forms a color video signal of a standard television system, such as an NTSC system, based on a narrow band luminance signal ($Y_L$) and each color difference signal (R−Y).(B−Y) supplied from the second matrix circuit 12 to which a white balance control being already executed and a wide band luminance signal ($Y_H$) supplied from the first low-pass filter 2. The color video signal thus formed is outgoing from the signal output terminal 15.

In this embodiment, three-primary-color signal (R).(G).(B) is separated from the line sequential color difference signal ($C_1$)/($C_2$) and a narrow band luminance signal ($Y_L'$) obtained from an image sensing element 1 as an image sensing output, and a white balance control is achieved on the thus separated three-primary-color signal (R).(G).(B). Then, based on the narrow band luminance signal ($Y_L'$) and each color difference signal (R-Y).(B-Y) reformed from the three-primary-color signal (R).(G).(B) to which the white balance control being already achieved, a composite color video signal is generated. Hence, because of the white balance control it follows that a control against the color temperature change is also achieved. In this manner, without providing a specific color temperature compensation circuit, it is possible to realize a high color reproducibility and high luminance reproducibility closely related to a color image sensing device using a primary color filter.

As is evident from the description given above with the embodiment, in the solid state color television camera of the present invention, a composite color video signal is formed by forming a three-primary-color signal from an image sensing output of a color difference sequential system color video camera, executing a white balance control to a primary color signal, and obtaining a luminance signal ($Y_L$) and respective color difference signals (R−Y).(B−Y) from the three-primary-color signal on which the white balance control being already achieved. Accordingly, without providing a specific color temperature compensation circuit, the control to the color temperature changes is executed by the aforementioned white balance control. As a result, it is possible to attain the desired end of a high color reproducibility and high luminance reproducibility closely related to a color image sensing device using a color filter.

Although an illustrative embodiment of this invention has been described in detail herein with reference to the accompanying drawings, it is to be understood that the invention is not limited to that precise embodiment, and that various changes and modifications could be effected therein by one skilled in the art without departing from the scope or spirit of the invention as defined in the appended claims.

What is claimed is:

1. A solid-state color television camera having a solid-state image sensing device with a color filter from which a luminance signal component and line-sequential color-difference signal components are generated, comprising:
    a signal converting means supplied with said line-sequential color-difference signal components for converting the same into first and second simultaneous color-difference signals;
    a signal separating means supplied with said first and second simultaneous color-difference signals and at least a first portion of said luminance signal component for generating first, second and third primary color signals;
    a level control means for controlling the levels of at least two of said primary color signals to achieve a white balance control;
    a matrix means supplied with the level-controlled primary color signals from said level control means and any of said primary color signals whose levels are not controlled by said level control means for generating at least first and second color-difference signals; and
    an encoding means supplied with the first and second color-difference signals from said matrix means and at least a second portion of said luminance signal component for generating a composite color video signal.

2. A solid-state color television camera according to claim 1, wherein said color filter includes a plurality of filter elements for passing magenta and green light components repeatedly arranged in a first line, and a plurality of filter elements for passing yellow and cyan light components repeatedly arranged in a second line such that said first and second lines are repeatedly arranged in a vertical direction.

3. A solid-state color television camera according to claim 1, further comprising a first low-pass filter and a second low-pass filter both supplied with said luminance signal component generating a wide-band luminance signal and a narrow-band luminance signal, respectively, said narrow-band luminance signal being supplied to said signal separating means as said first portion of said luminance signal component and said wide-band luminance signal being supplied to said encoding means as said second portion of said luminance signal component.

4. A solid-state color television camera according to claim 1, wherein said signal converting means includes a detection means supplied with said line-sequential color-difference signal components for producing line-sequential color-difference signals, a delay means supplied with said line-sequential color-difference signals for producing delayed line-sequential color-difference signals and a switching means supplied with said line-sequential color-difference signals and said delayed line-sequential color-difference signals for producing said first and second simultaneous color-difference signals.

* * * * *